C. A. CARTWRIGHT.
CHEMICAL FEEDING DEVICE FOR WATER SOFTENERS.
APPLICATION FILED MAR. 13, 1915.
1,231,128.
Patented June 26, 1917.
2 SHEETS—SHEET 2.
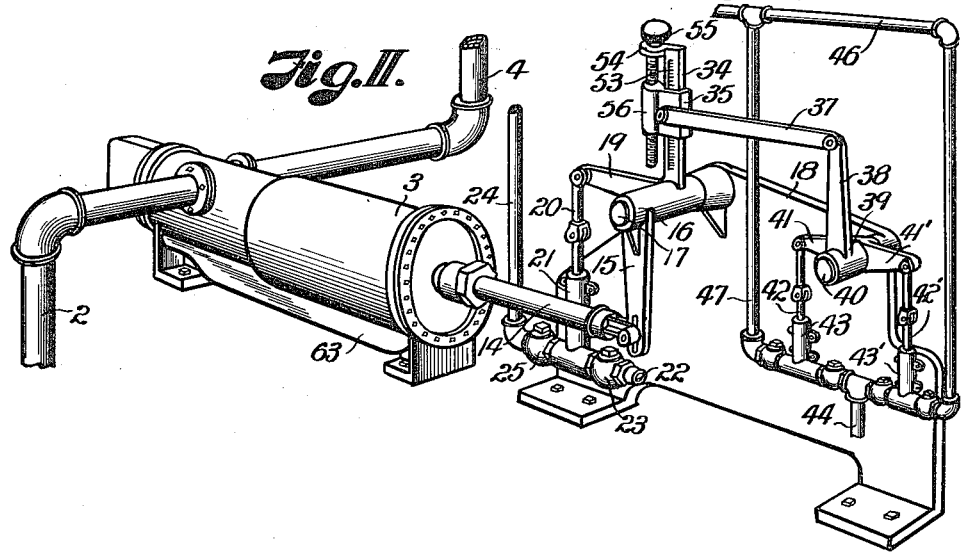
WITNESSES:
Arthur W. Capps.
Lynn A. Robinson.
INVENTOR
Chapin A. Cartwright.
BY
Arthur L. Brown,
ATTORNEY

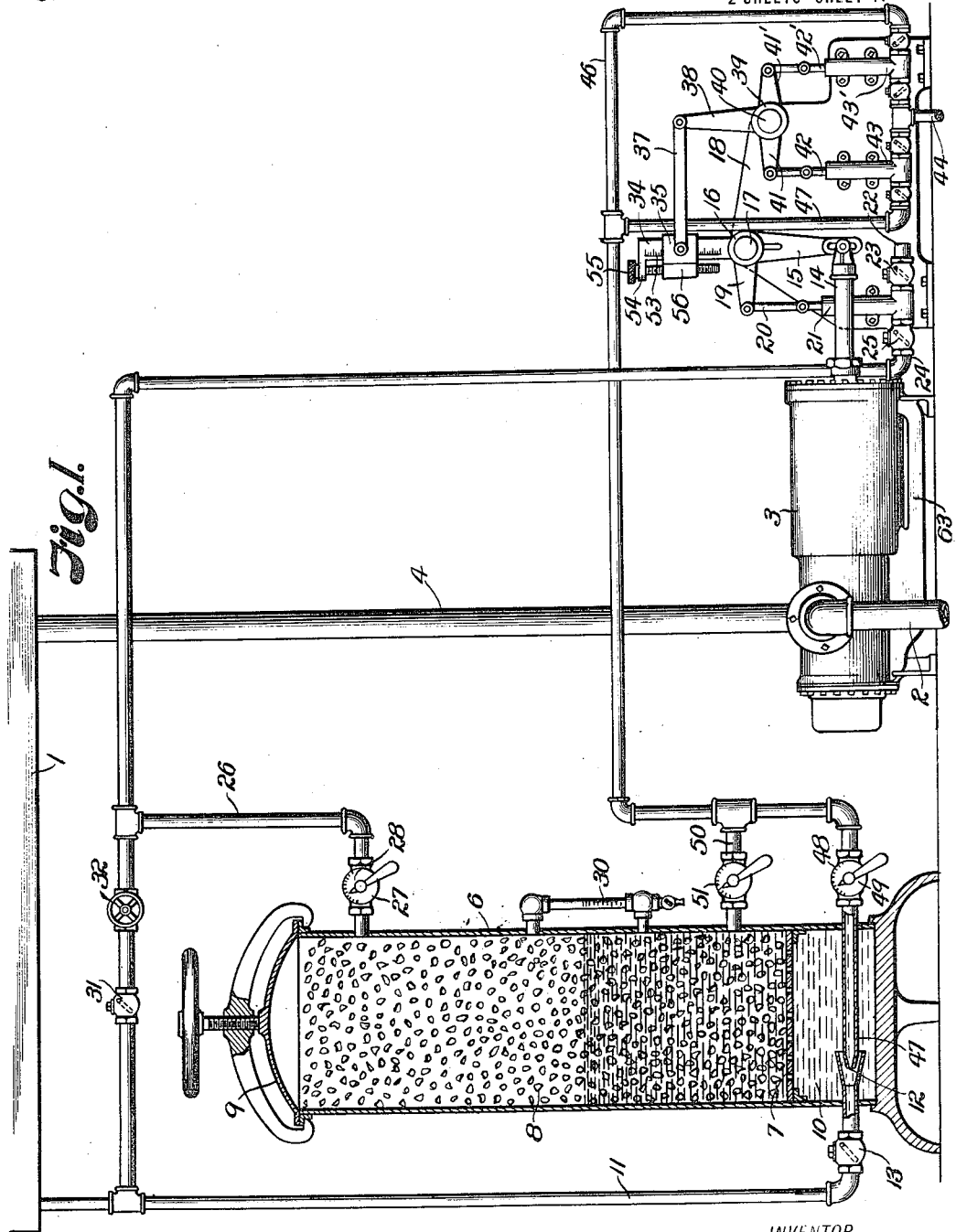

UNITED STATES PATENT OFFICE.

CHAPIN ALPHEUS CARTWRIGHT, OF CHICAGO, ILLINOIS.

CHEMICAL-FEEDING DEVICE FOR WATER-SOFTENERS.

1,231,128.  Specification of Letters Patent.  Patented June 26, 1917.

Application filed March 13, 1915. Serial No. 14,192.

*To all whom it may concern:*

Be it known that I, CHAPIN ALPHEUS CARTWRIGHT, a citizen of the United States, residing at Chicago, in the county of Cook and State of Illinois, have invented certain new and useful Improvements in Chemical-Feeding Devices for Water-Softeners; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a chemical feeding device for water softeners, and has for its principal object to provide mechanism whereby chemical solution may be fed to a storage tank in quantities measured to and by the water supply.

In carrying out my invention I utilize a water motor through which the water for the softening compound is flowed, together with mechanism operable by the motor for delivering chemical solution to, the main water supply so that the supply of solution is measured by the operation of the motor which, in turn, is controlled by the flow of water, so that the ingredients of the softening compound may be properly proportioned.

In accomplishing my object I provide improved details of structure, the preferred forms of which are illustrated in the accompanying drawings, wherein:—

Figure I is an elevation of a feeding mechanism containing my improvements; the chemical solution tank being in vertical section.

Fig. II is a perspective view of the feeding mechanism and water motor.

Referring more in detail to the parts:

1 designates the storage tank for treating water, 2 a water supply pipe which may be connected with a city main, 3 a water motor which is supplied from the pipe 2, and 4 a pipe fed from the motor and leading to the storage tank.

Located adjacent the motor and storage tank is a chemical solution tank 6 having an apertured diaphragm 7 near the bottom for supporting a chemical, such as soda ash 8, and preferably provided with a clamp top 9 whereby the tank may be effectually sealed.

Leading from the solution chamber 10 in the bottom of the chemical tank is a pipe 11, which opens into the bottom of the storage tank 1 and has a flaring aspirator mouth 12 located within the solution chamber; the pipe 11 being provided with a check valve 13 for preventing back flow from the storage tank.

The motor is provided with a suitable piston (presently described) having a rod 14 pivotally connected at its outer end with the arm 15 of a bell crank lever 16, which is pivotally mounted on a stub shaft 17 carried by a frame 18 and having a second arm 19 connected with the rod 20 of an air pump 21.

The air pump 21 has an intake 22 provided with a check valve 23 and an outlet pipe 24 provided with a check valve 25; the outlet pipe having connection with the upper portion of the chemical tank 6 through a branch 26, in order that air may be delivered to the upper portion of the chemical tank under pressure at intervals relative to the water feed to force solution from the chemical tank to the storage tank.

The branch 26 is equipped with a valve 27 having an index 28 for indicating the flow area and which may be adjusted to maintain the solution in the chemical tank at a desired level, which may be indicated on a gage 30 on the chemical tank.

The air line pipe 24 leads past the branch 26 and opens into the solution feed pipe 11 in order to agitate the solution during its travel to the storage tank; the part of the pipe between the branch and solution feed pipe being provided with a check valve 31 for preventing flow of solution through the air pipe, and with a manual valve 32 whereby the flow of either air or water may be positively cut off.

The bell crank lever 16, which is operable from the motor, is provided with a vertical arm 34 and slidably mounted on said arm is a head 35 having a link 37 connecting the same with the arm 38 of a bell crank lever 39, which is pivotally mounted on a stub shaft 40, also carried by the frame 18.

The bell crank lever 39 is provided with paired arms 41—41' having link connection with the rods 42—42' of pumps 43—43' that are fed independently of each other from a water supply pipe 44, so that water is taken into the pump 43 at one stroke of the motor piston and into the pump 43′ at the reverse stroke; the pump being provided with the usual check valves used in such mechanisms.

Leading from the pump 43′ is a pipe 46, and leading from the pump 43 is a pipe 47, which opens into the pipe 46, so that while the pumps are independent of each other they both eventually feed into the same supply pipe 46.

The pipe 46 leads into the solution chamber 10 of the chemical tank and has a nozzle 47 projected into the aspirator mouth of the solution feed pipe 11, so that as a charge of water is delivered through the pipe 46 by either of the pumps, it has an injector-like action to force the solution through the supply pipe, which action aided by the air pressure in the chemical tank serves to feed solution to the storage tank. The pipe 46 is equipped with a valve 48 having an indicator 49 whereby the feed may be controlled to synchronize with the other feeding elements.

Leading from the pipe 46 is a branch 50, which opens into the chemical tank above the solution chamber to supply water to the chemical in order to produce the solution; the branch also being provided with an indicator valve 51.

In order to regulate the flow of water to the ejector, I provide a scale 53 on the vertical arm 34 of the bell crank lever 16 and extend an arm 54 from the arm 34, so that it may carry a screw 55 which threads into a collar 56 on the head 35 to adjust the position of the head on the lever arm and thereby lengthen or shorten the stroke of the bell crank lever which operates the water pumps 43—43′.

In using the device, presuming the parts to be constructed and assembled as described, with the chemical tank supplied and the water connections made, high pressure water flowing into the motor actuates the motor to pump air into the chemical tank and pump water from the independent branch into the ejector, so that a determined charge of solution is fed from the chemical tank to the storage tank with the stroke of the piston.

When the piston of the water motor reaches the end of its stroke, it is reversed so that the charge of water which originally actuated the motor is delivered to the storage tank and a new motive charge delivered to the opposite end of the piston, this action continuing while the supply is led to the motor.

It is apparent that with the connections described, the supply of water and air may be regulated to meet the requirements, and that the solution is fed to the storage tank in direct proportion to the feed of water.

Having thus described my invention, what I claim as new therein, and desire to secure by Letters-Patent, is:

1. The combination with a receiver, of a tank, means for supplying water to the receiver, a conduit leading from the tank to the receiver, and means for forcing air into the tank to induce flow of fluid from the tank through the conduit into the receiver.

2. The combination with a receiver, of a chemical container, a conduit leading to the receiver, a motor interposed in said conduit, a pump operable by the motor, a chemical supply conduit leading from the container to the receiver, and a conduit leading from the pump to the container and having an injector relation with the chemical supply conduit.

3. The combination with a receiver, of a chemical container, a conduit leading from the container to the receiver, a fluid supply conduit leading to the receiver, a motor interposed in said conduit, and an air pump operable by the motor and adapted to deliver air to the container.

4. The combination with a receiver, of a chemical container, a conduit leading from the container to the receiver, a fluid supply conduit leading to the receiver, a motor interposed in said fluid supply conduit and operable by fluid passing through said conduit, an air pump operable by the motor and adapted to deliver air to the container, and a water supply pump operable by the motor and having injector relation with the chemical supply conduit.

5. The combination with a receiver, of a chemical container, a chemical supply conduit leading from the container to the receiver, a water supply conduit leading to the receiver, a motor served from said conduit, an air pump operable by the motor and having connection with the container, and a water pump operable from the motor and having connection with the container.

6. The combination with a receiver, of a chemical container, a chemical supply conduit leading from the container to the receiver, a water supply conduit leading to the receiver, a motor served from said conduit, an air pump operable by the motor and having connection with the container, and an adjustable water pump operable from the motor and having connection with the container.

7. The combination with a receiver, of a chemical container, a conduit leading from the container to the receiver, means for conducting water under pressure to the receiver, a motor operable by said means, an air pump operable by the motor, and a conduit leading from the air pump to the container and chemical supply conduit.

8. The combination with a receiver, of a chemical container, a conduit leading from the container to the receiver, means for conducting water under pressure to the receiver, a motor operable by said means, an air pump operable by the motor, a conduit leading from the air pump to the container and chemical supply conduit, and separate means for controlling flow of air to the container and supply conduit.

9. The combination with a receiver, of a chemical container comprising a solution chamber, a conduit leading from said chamber to the receiver, a conduit for conducting water to the receiver, a motor served by water from the water conduit, an air pump operable by said motor, a conduit leading from the air pump to the container above the solution, a water pump operable by the motor, a conduit leading from the pump to the solution chamber and having injector relation to the conduit leading from the solution chamber to the receiver, and a branch on said water conduit opening into the container above the solution chamber.

In testimony whereof I affix my signature in presence of two witnesses.

CHAPIN ALPHEUS CARTWRIGHT.

Witnesses:
  MARIE PHELAN,
  L. C. PUGH.